Feb. 27, 1940. A. J. SNOW 2,191,868
TOY WAGON BODY
Filed Dec. 30, 1937
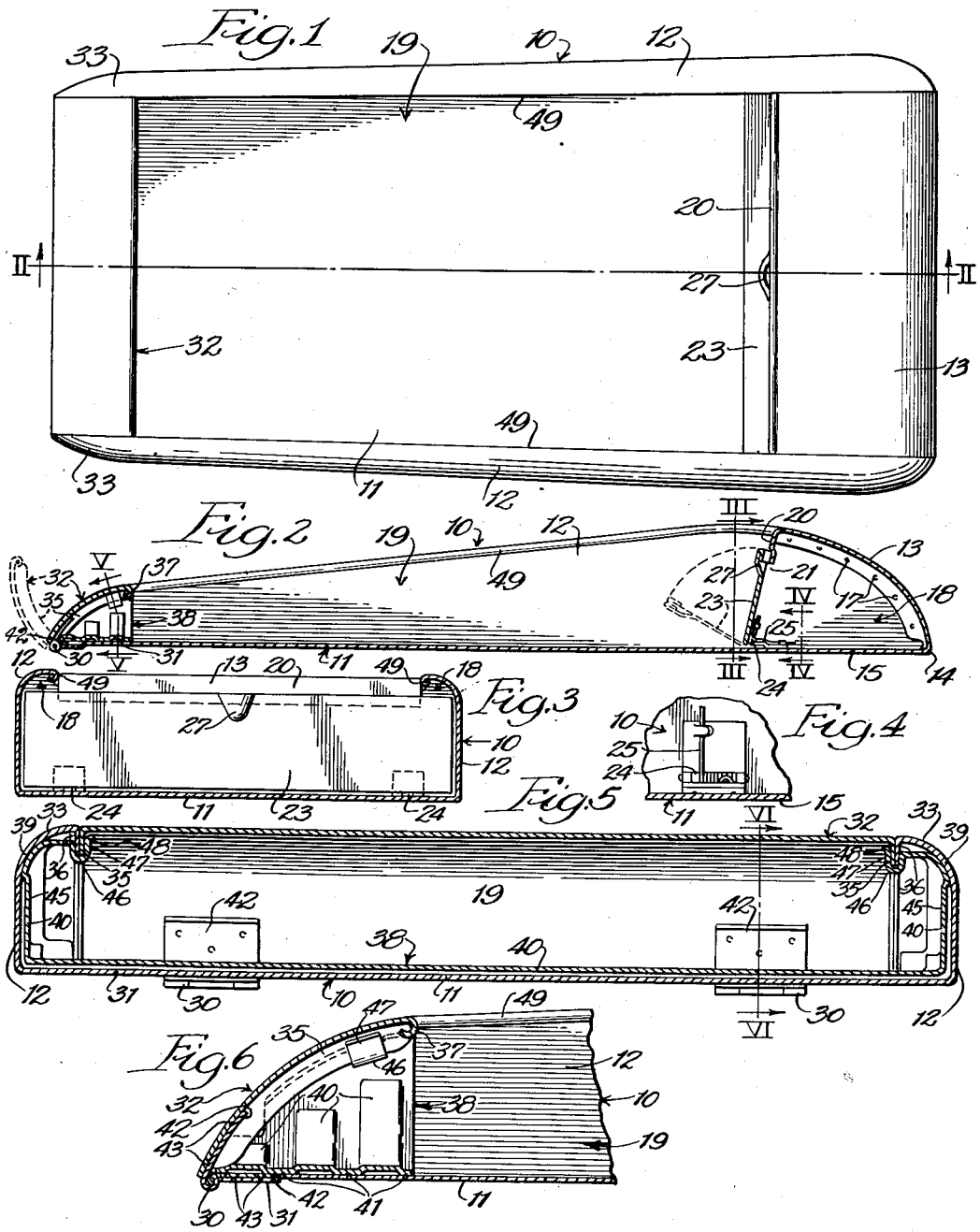
Inventor:
Adolph J. Snow,
By Ira M. H. Marks,
Attorney Patented Feb. 27, 1940

2,191,868

UNITED STATES PATENT OFFICE 2,191,868

TOY WAGON BODY

Adolph J. Snow, Wilmette, Ill., assignor to Sears, Roebuck and Co., Chicago, Ill., a corporation of New York Application December 30, 1937, Serial No. 182,529

10 Claims. (Cl. 296—57)

This invention relates to toy vehicles and concerns more particularly the body construction thereof.

It is an object of my invention to provide a wagon body affording improved storage facilities.

A further object is to provide a wagon of this type which is easily cleaned out.

It is also an object to provide a toy wagon body of increased strength and simplicity.

Further objects and advantages of the invention will appear as the description proceeds.

My invention will be understood upon reference to the following description and accompanying drawing, in which:

Fig. 1 is a plan view of a vehicle body constructed in accordance with the invention.

Fig. 2 is a longitudinal sectional view taken as indicated by the line II—II in Fig. 1.

Fig. 3 is a transverse sectional view taken as indicated by the line III—III in Fig. 2.

Fig. 4 is a fragmentary enlarged sectional view taken as indicated by the line IV—IV in Fig. 2.

Fig. 5 is an enlarged transverse sectional view taken as indicated by the line V—V in Fig. 2.

Fig. 6 is an enlarged fragmentary longitudinal sectional view taken as indicated by the line VI—VI in Fig. 5.

Referring now more particularly to the drawing, a vehicle body constructed in accordance with my invention is shown as formed of sheet material such as sheet metal, and includes a box section 10 affording a floor 11, sides 12 and a front or nose 13 turned upward and back from the front end 14 so as to overhang the front portion 15 of the floor. The sides 12 and front part 13 have marginal flanges joined as by spot welding 17, riveting or other suitable means, providing concealed reinforcement ribs extending longitudinally of the body and forming an integral body having a forward compartment 18 and a main open-topped space 19.

The part 13 has a free rear margin which is bent down as shown at 20, forming a transverse reinforcing rib and defining the top of an opening 21 leading to the compartment 18. A gate or door 23 is hinged at 24 to the floor and extends substantially the full width of the opening 21, thus projecting under the overhanging portions of the sides 12. The door is urged by a spring 25 to the upright position shown in full lines in Figs. 1 to 4, the margin 20 serving as a stop for the door. The door is thus effective in retaining tools, packages and other articles in the compartment 18. The door has a rearwardly depressed portion 27 engageable by a finger of the hand to facilitate opening of the door. Any other suitable handle means could be provided if desired.

Hinged at 30 to the rear end 31 of the floor 11 is a door 32 which, in closed position, is arranged flush with the adjacent overhanging rear portions 33 of the sides 12, as may be gathered from Figs. 1, 2, 5 and 6, much in the fashion of a rumble seat door. The hinge is arranged so as to be substantially concealed by the door from the top. The door 32 has side flanges 35 adapted to slide between corresponding flanges 36 extending down from the edges of the side portions 33 of the body as is apparent from Fig. 5, and has a smooth forward edge 37 adapted to be grasped by the hand to swing the door.

A U-shaped reinforcing member or brace 38 is fitted transversely in and in conformity with the rear of the body 10 and is spot welded as at 39 or otherwise suitably secured to the floor portion 31 and side portions 33. The member 38 is preferably formed with corrugations or ribs 40 running transverse to the body and affording increased strength. One of the hinge brackets or wings 42 is fitted between the floor portion 31 and the member 38 and is spot welded as at 43 or otherwise suitably secured to the portion 31, the other wing being similarly secured to the door 32.

The arms 45 of the brace 38 have extensions in the form of U-clips 46 which receive the flanges 36 and are adapted also to slidingly and snugly receive the door flanges 35. The free arms 47 of the clips are preferably resilient and the upper extremities thereof are preferably curved as at 48 to cam or guide the door flanges as the door is moved to closed position. When the door is closed it conceals the clips.

The interior of the body may be cleaned out easily by swinging open the door 32 to provide an exit, whether sweeping is resorted to or the forward end raised and the foreign matter dumped out through the rear of the body.

The upper edges of the sides 12 bordering the main space 19 are preferably smooth as shown at 49, as are the remaining edges bordering said space, for safe handling.

It will be appreciated from the foregoing that I have provided an attractive toy vehicle of great strength and simplicity, with provision for storage of tools, packages, etc., so as to leave free the space adapted to be occupied by the rider, and for easy cleaning of the interior of the body.

I am aware that many changes may be made and numerous details of construction varied through a wide range without departing from the principles of my invention, and I therefore do not purpose limiting the patent granted hereon otherwise than as necessitated by the prior art.

1. A vehicle body comprising a floor, side, front and back portions extending up from said floor, one of said portions constituting a door, and a member united with and reinforcing the portions adjacent said door.

2. A vehicle body comprising a floor, side, front and back portions extending up from said floor, one of said portions constituting a door connected to said floor, and a member independent of said door and united with and reinforcing the portions and floor adjacent said door.

3. A vehicle body comprising a floor, side, front and back portions extending up from said floor, one of said portions constituting a door, and a member united with and reinforcing the portions adjacent said door, said member having means for stopping the closing movement of the door.

4. A toy vehicle comprising a body having a floor and sides and a front wall extending rearwardly and joined to said sides, forming a front storage space, and a gate closing the rear of said space.

5. A toy vehicle comprising a body affording a storage space at an end thereof and opening within the body, a gate mounted in said body and arranged to close the opening to said space, and spring means for yieldably closing said gate.

6. In a vehicle body having a box with a connected end door, a reinforcing member comprising a U-shaped bracket formed to be connected to the floor and sides of the body adjacent the door and having means for preventing accidental opening of the door.

7. A vehicle body comprising a floor and sides, said sides having portions projecting inwardly at the rear end of the floor so as to overhang said floor, the overhanging portions of said sides having forwardly projecting flanges, a gate hinged to said rear end and having forwardly projecting side flanges for substantially sliding engagement with the aforesaid flanges, and means providing sockets for releasably retaining the flanges of said gate adjacent the flanges of said sides to hold the door in closed position.

8. A vehicle body comprising a floor and sides, said sides having portions projecting inwardly at the rear end of the floor so as to overhang said floor, the overhanging portions of said sides having forwardly projecting flanges, a gate hinged to said rear end and having forwardly projecting side flanges for substantially sliding engagement with the aforesaid flanges, means providing sockets for releasably retaining the flanges of said gate adjacent the flanges of said sides to hold the door in closed position, and means transversely reinforcing said sides together with said rear end.

9. A vehicle body comprising a floor and sides, said sides having portions projecting inwardly at the rear end of the floor so as to overhang said floor, the overhanging portions of said sides having forwardly projecting flanges, a gate hinged to said rear end and having forwardly projecting side flanges for substantially sliding engagement with the aforesaid flanges, means transversely reinforcing said sides to prevent spreading thereof, and means comprising extensions of said reinforcing means for releasably retaining the flanges of said gate adjacent the flanges of said side to hold the door in closed position.

10. A toy vehicle comprising a floor and side walls integrally connected to and extending upward from said floor, a door mounted on said floor near the forward end of said floor and extending between said walls, a second door disposed at the rear end of said floor and extending between said walls, and reenforcement means integrally connected to said floor and said side walls at the forward and rear ends of said floor, the said reenforcement means at the forward end of said floor extending upward in front of the first door.

ADOLPH J. SNOW.